(12) United States Patent
Gapontsev et al.

(10) Patent No.: US 10,520,790 B2
(45) Date of Patent: Dec. 31, 2019

(54) ULTRA-HIGH POWER SINGLE MODE GREEN FIBER LASER OPERATING IN CONTINUOUS WAVE AND QUASI-CONTINUOUS WAVE REGIMES

(71) Applicant: IPG PHOTONICS CORPORATION, Oxford, MA (US)

(72) Inventors: Valentin Gapontsev, Worcester, MA (US); Igor Samartsev, Westborough, MA (US); Alexey Avdokhin, Southboro, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 14/590,752

(22) Filed: Jan. 6, 2015

(65) Prior Publication Data

US 2019/0163032 A1 May 30, 2019

(51) Int. Cl.
*G02F 1/37* (2006.01)
*G02F 1/35* (2006.01)
(Continued)

(52) U.S. Cl.
CPC ............. *G02F 1/37* (2013.01); *G02F 1/353* (2013.01); *H01S 3/0092* (2013.01);
(Continued)

(58) Field of Classification Search
CPC .......... G02F 1/353; G02F 1/37; H01S 3/0092; H01S 3/109; H01S 3/1301; H01S 3/1618; H01S 5/0092
See application file for complete search history.

(56) References Cited

U.S. PATENT DOCUMENTS

| | | | |
|---|---|---|---|
| 5,867,305 A * | 2/1999 | Waarts | H01S 3/06754 359/337.12 |
| 2007/0035810 A1 * | 2/2007 | Henderson | H01S 3/0675 359/330 |

(Continued)

FOREIGN PATENT DOCUMENTS

| | | | | |
|---|---|---|---|---|
| WO | WO-2013106456 A1 * | 7/2013 | | H01S 3/1301 |
| WO | WO-2015103622 A1 * | 7/2015 | | G02F 1/37 |

*Primary Examiner* — Daniel Petkovsek
(74) *Attorney, Agent, or Firm* — Yuri B. Kateshov, Esq.; Timothy J. King, Esq.

(57) ABSTRACT

A single-mode (SM) Green fiber laser is configured to operate in a Green spectral range in a continuous-wave (CW) or quasi-continuous-wave (QCW) mode. The Green laser is configured with a pump source, outputting narrow-linewidth pump light at a fundamental wavelength in one (1) micrometer spectral range, and a single-pass second harmonic generator (SHG), such as a nonlinear LBO crystal, frequency doubling the pump light to output Green light at a signal wavelength. The pump light source is configured to have a MOPFA configuration with a SM seed which emits the SM pump light with a linewidth narrower than 0.2 nm, and at least one ytterbium ("Yb") fiber amplifier receiving and amplifying the SM pump light at the fundamental wavelength while maintaining the linewidth narrower than 0.2 nm. The SM Green fiber laser operates with a wall plug efficiency between 15% and 30% in a 510-540 nm signal wavelength range and a power range between about 50 W and kW-levels.

16 Claims, 6 Drawing Sheets

(51) Int. Cl.

| | |
|---|---|
| *H01S 3/10* | (2006.01) |
| *H01S 3/13* | (2006.01) |
| *H01S 3/067* | (2006.01) |
| *H01S 3/00* | (2006.01) |
| *H01S 3/16* | (2006.01) |

(52) U.S. Cl.
CPC ...... *H01S 3/06745* (2013.01); *H01S 3/10015* (2013.01); *H01S 3/10061* (2013.01); *H01S 3/1301* (2013.01); *G02F 2001/354* (2013.01); *H01S 3/06758* (2013.01); *H01S 3/1003* (2013.01); *H01S 3/1618* (2013.01); *H01S 2301/02* (2013.01); *H01S 2301/03* (2013.01)

(56) References Cited

U.S. PATENT DOCUMENTS

| | | | | |
|---|---|---|---|---|
| 2009/0103576 | A1* | 4/2009 | Achtenhagen | H01S 3/10092 372/22 |
| 2011/0305256 | A1* | 12/2011 | Chann | G02B 27/0905 372/75 |
| 2012/0195333 | A1* | 8/2012 | Huang | H01S 3/0092 372/22 |

* cited by examiner

Known Art

Known Art

FIG. 4A
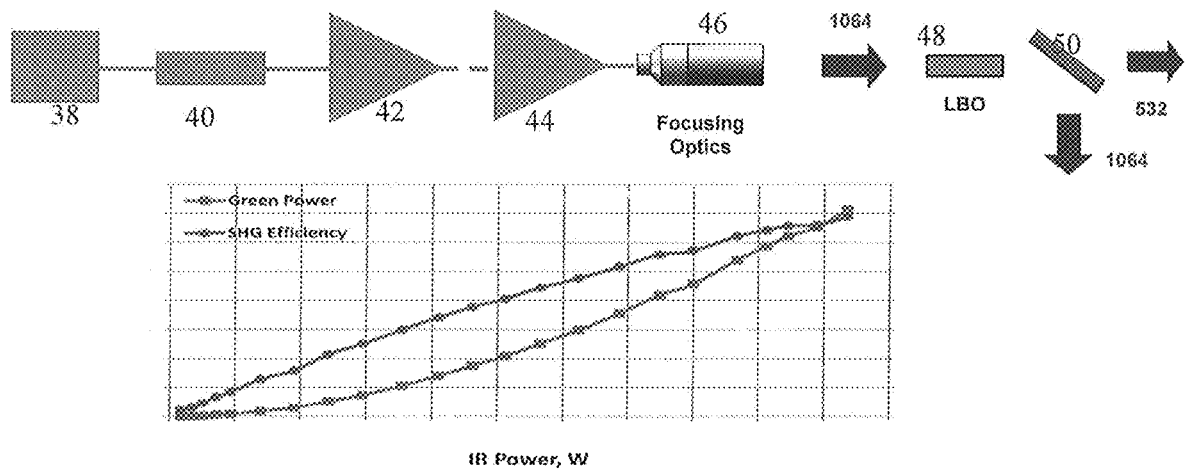
FIG. 4B
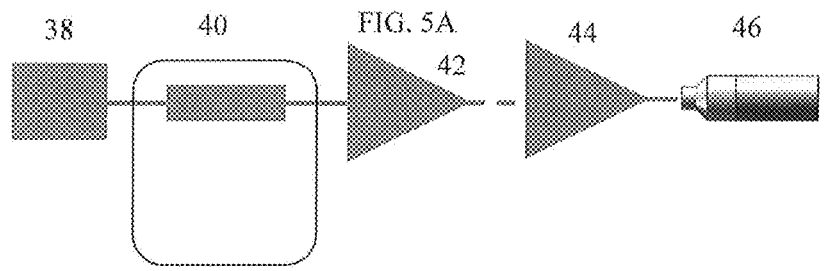
FIG. 5A
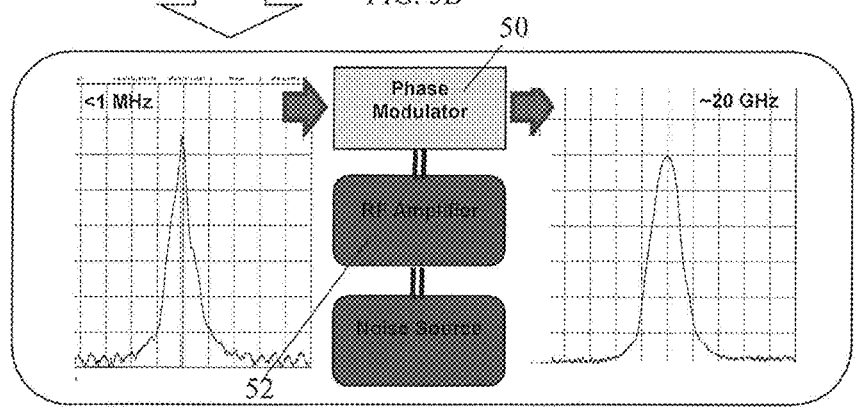
FIG. 5B
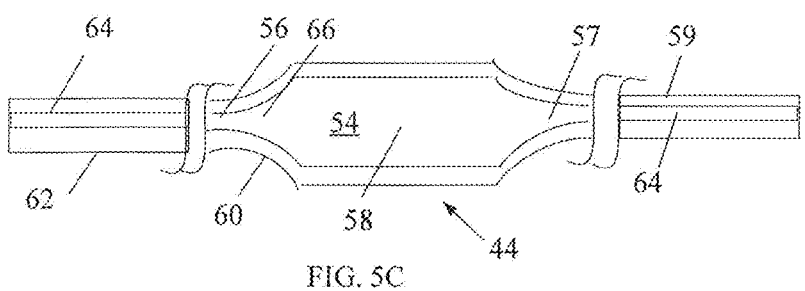
FIG. 5C

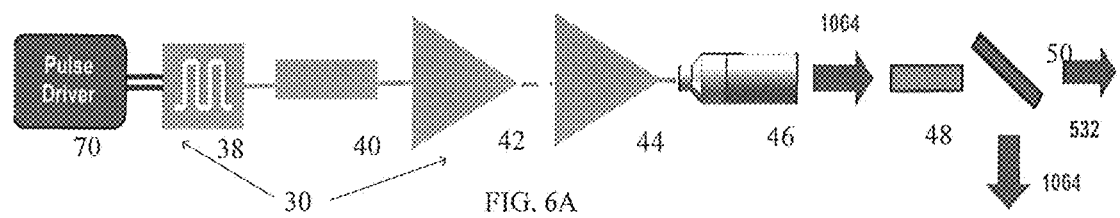
FIG. 6A
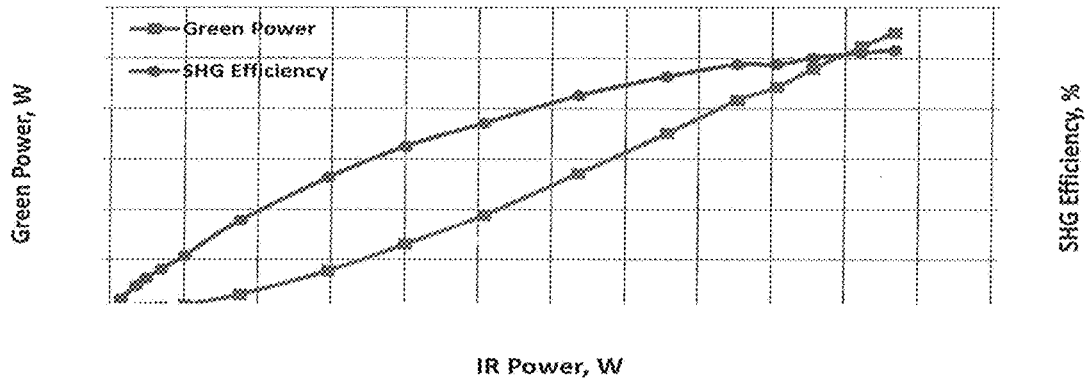
FIG. 6B
FIG. 7A
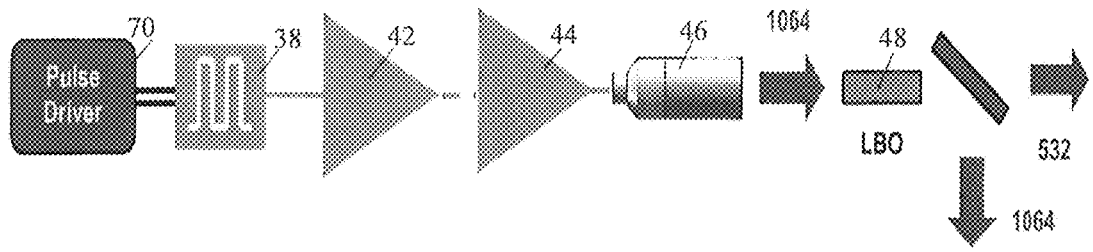
FIG. 7B
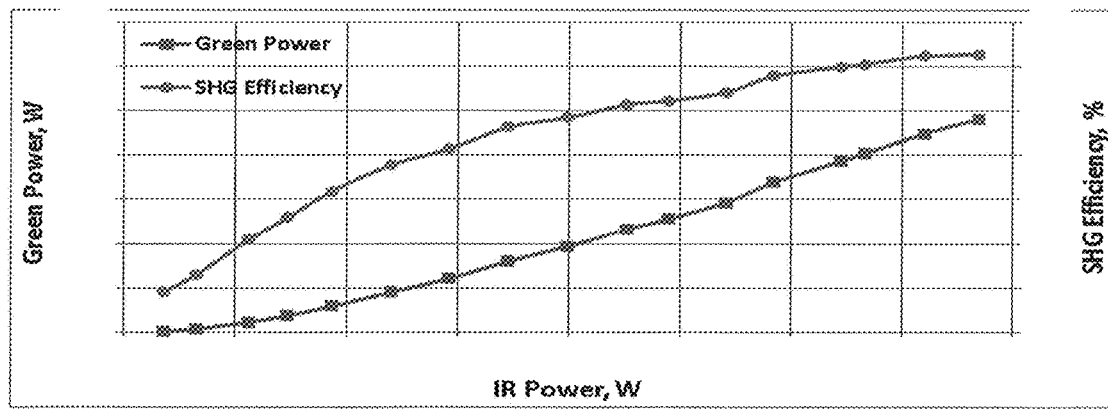

ULTRA-HIGH POWER SINGLE MODE GREEN FIBER LASER OPERATING IN CONTINUOUS WAVE AND QUASI-CONTINUOUS WAVE REGIMES

BACKGROUND OF THE INVENTION

Field of the Invention

This disclosure relates to high power fiber lasers based on single-pass frequency doubling of a pump signal at a fundamental frequency in non-linear crystals and operating at wavelengths in ultraviolet and visible spectral ranges. In particular, the disclosure relates to a single-mode ("SM") green laser system, based on single-pass frequency doubling of a narrow-linewidth ytterbium ("Yb") fiber laser in lithium triborate ("LBO") crystal and configured to operate in a range of regimes including continuous-wave ("CW") and a high-repetition-rate quasi-continuous-wave ("QCW"). More particularly, the disclosure relates to a SM fiber green laser system operative to generate an output with average powers of over 550 W in the QCW regime and over 350 W in the CW regime with the wall-plug efficiency up to 25%.

Glossary

An amplifier stage between a seed laser or source and a booster amplifier is generally referred to herein as a preamplifier.

Booster as used herein refers to the last optical amplifier before delivery of an amplified beam to a target or a wavelength converter.

Continuous wave (CW) laser refers to a laser that emits radiation continuously rather than in short bursts, as in a pulsed laser.

Conversion Efficiency refers to the conversion of optical power from from one wavelength to another wavelength.

Duty Cycle (D) refers to the product of the pulse duration τ and the pulse repetition frequency (PRF) for pulses that occur at regular intervals. The duty cycle may be expressed as a ratio, for example, 0.01 or equivalently may be expressed as a percentage in a range between 1% and 100% with the 100% duty cycle describing a CW mode-operating laser.

Diode Laser refers to a light-emitting diode designed to use stimulated emission to generate a coherent light output. Diode lasers are also known as laser diodes or semiconductor lasers.

Diode-Pumped laser refers to a laser having a gain medium that is pumped by a diode laser.

Gain refers to an increase in intensity, power, or pulse energy of a signal that is transmitted from one point to another through an amplifier.

Gain Medium refers to a material capable of generating optical gain as described below with respect to a laser.

Laser is an acronym for light amplification by stimulated emission of radiation.

Nonlinear optical crystal refers to the lithium triborate nonlinear optical crystal (LBO).

Light: As used herein, the term "light" generally refers to electromagnetic radiation in a range of frequencies running from infrared through the ultraviolet.

Non-critically phase matching is a technique for obtaining phase matching of a nonlinear process. In this case, the beams propagate down one of the axes of the non-linear crystal and the temperature of the crystal is adjusted. The propagation direction is normally at 90° to the optical axis of birefringent nonlinear crystal. This technique does not require perfect alignment between pump and generated beams and is not accompanied by a spatial walk-off phenomenon known to reduce the conversion efficiency.

Non-linear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Scattering are examples of non-linear effects.

Nonlinear Optical Wavelength Conversion Processes are non-linear optical processes whereby input light of a given vacuum wavelength $\lambda_0$ passing through a non-linear medium interacts with the medium and/or other light passing through the medium in a way that produces output light having a different vacuum wavelength than the input light. Nonlinear wavelength conversion is equivalent to nonlinear frequency conversion, since wavelength and frequency are related by the vacuum speed of light. Both terms may be used interchangeably. Nonlinear Optical Wavelength conversion includes Higher Harmonic Generation (HHG), e.g., second harmonic generation (SHG), third harmonic generation (THG), fourth harmonic generation (FHG), etc.

Non-linear material refers to materials that possess a non-zero nonlinear dielectric response to optical radiation that can give rise to non-linear effects. Examples of non-linear materials include crystals of lithium triborate (LBO) and the like.

Optical amplifier refers to an apparatus that amplifies the power of an input optical signal. An optical amplifier is similar to a laser in that it uses a gain medium driven by pumping radiation but generally lacks feedback (i.e. a cavity), so that it has gain but does not oscillate.

Peak power refers to the highest optical power in the time domain and in pulsed laser systems may generally be approximated by the energy of the pulse divided by the pulse duration.

Phase-matching refers to the technique used in a multiwave nonlinear optical process to enhance the distance over which the coherent transfer of energy between the waves is possible. For example, a three-wave process is said to be phase-matched when $k_1+k_2=k_3$, where $k_1$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Polarization extinction ratio (PER) is the ratio of optical powers of perpendicular polarizations. The PER is used to characterize the degree of polarization the laser.

Pulse Duration (τ) refers to the temporal duration or lifetime of a repetitive signal, e.g., the time interval between the half-power points on the leading and trailing edges of the pulse. Pulse duration is sometimes referred to as "pulse width".

Pulse Energy refers to the amount of energy in a pulse. Pulse energy may be calculated by integrating instantaneous pulse power over the pulse duration.

Pulse Period (T) refers to the time between equivalent points of successive pulses in a train of two or more pulses.

Pulse Repetition Frequency (PRF) refers to the rate of repetition of pulses per unit time. The PRF is inversely related to the period T, e.g., PRF=1/T.

Quasi-CW refers to generating a succession of pulses at a high enough repetition rate to appear continuous.

Raman nonlinear effect refers to the phenomenon observed when intense laser light is coupled into an optical fiber and generates a second, longer wavelength due to stimulated Raman scattering. This Raman-scattered light can itself undergo Raman scattering. If the fiber is long enough, the process cascades to produce several wavelengths or Stokes orders.

Single frequency laser refers to lasers emitting radiation in a single longitudinal mode.

Single transverse mode or single mode (SM) laser refers to a laser operating on a single transverse mode. The transverse mode determines the intensity distribution on the cross-section of the emitted beam. The SM beam is characterized here by the laser's beam quality parameter M2≤1.15 at full power. The M2 factor is a common measure of the beam quality of a laser beam.

Speckle noise refers to the observable random intensity pattern of speckles.

Stimulated Brillouin Scattering (SBS) is a nonlinear phenomenon manifested by the loss of power of the incident wave.

Stokes orders of the Raman spectrum (stoke) refer to different radiation bands or Raman lines appearing in the spectrum of monochromatic light in addition to standard lines due to Raman scattering.

Quasi-phase-matched (qpm) material: in a quasi-phase-matched material, the fundamental and higher harmonic radiation are approximately phase-matched by periodically changing the sign of the material's non-linear coefficient.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Wall-plug efficiency (WPE) refers to the energy conversion efficiency with which the system converts electrical power into optical power. It is defined as the ratio of the total optical output power to the input electrical power.

Prior Art Discussion

The development of high power green lasers has opened new industrial possibilities for a variety of green laser applications that can benefit from a specific wavelength range of roughly 495-570 nm and a recent spike of increased green light power levels in this wavelength range. The green wavelength sources provide two distinct advantages as compared to more popular infra-red (IR) sources. One of the advantages stems from the shorter wavelength which inherently provides a lower divergence and smaller focal spot. The other advantage is a relatively low reflectivity of metals (especially of such highly-reflective metals as copper, gold and silver) at the shorter wavelengths which allows a higher percentage of power to be coupled into the target. Accordingly, high-power GREEN lasers proved to be particularly advantageous in demanding additive manufacturing applications, as well as in copper welding which is the major process for manufacturing fuel cells used to power electric vehicles. The semiconductor industry also finds a variety of green laser applications such as wafer annealing, low temperature poly-silicon ("LTPS") display annealing and solar cell manufacturing. Still another broad application area is the entertainment industry which uses high power green lasers for laser-shows and laser projectors.

Ideally, a green laser source for the above-disclosed applications should have a single transverse mode ("SM"), good efficiency and high power output. Multiple laser technologies, striving towards this goal, are briefly discussed hereinbelow.

Diode Pumped Solid State Lasers ("DPSS")

Historically, first high-power green lasers were argon ion lasers known for a large, bulky and highly inefficient configuration which required extensive cooling and incurred a high cost of ownership. The output power of these lasers is generally limited to a few 10 s of Watts. With the advance of DPSS laser technology, argon ion lasers have been gradually replaced by more powerful, efficient and compact frequency doubled DPSS lasers.

The DPSS green laser sources use commonly available Nd:YAG and Nd:YVO$_4$ laser systems combined with an intracavity or extracavity frequency doubling setup. Non-linear crystals like lithium triborate (LBO), potassium titanyl phosphate (KTP) and periodically poled lithium tantalate (PPLT) have been used extensively for frequency conversion.

In spite of the widespread benefits from the DPSS technology, the scaling of green output power from intracavity frequency doubled SM DPSS lasers beyond ~100 Watt power level is challenging due to the thermal beam distortion in the laser crystal. The external resonator cavity design incorporating nonlinear crystal for green generation has been used in conjunction with stand-alone SM DPSS lasers capable of outputting 130 W of green output power. Higher powers have been reported with fundamental transverse mode being limited by a fundamental IR power.

Semiconductor Lasers

There are two types of semiconductor based laser systems: direct electrically pumped and more recently developed indirect optically pumped systems. Directly pumped SM green semiconductor lasers are currently limited to very low powers typically <100 mW. Further power scaling of this type of lasers requires a developmental work research.

In contrast, significantly higher output powers can be obtained with the optically pumped semiconductor laser ("OPSL") which use a thin semiconductor multilayer as the gain medium which generally incorporates a highly reflective ("HR") mirror layer adjacent to the gain medium. This structure is usually grown with a large surface area mounted on the heat sink. The OPSL gain medium is enclosed within a resonant cavity and usually pumped with a diode laser. Since OPSLs are usually emitting in the near IR range, in order to generate green light, they incorporate intracavity frequency doubling crystals.

While maintaining a fundamental mode beam quality, 20 W of CW green radiation has been reported. Further scaling of the OPSL is possible by placing multiple OPS chips in a single cavity, but at the cost of the beam quality. Hence this technology is currently limited to under 50 W laser systems operating in a single-mode regime.

Thin Disk Lasers

Another technology for achieving high green output powers is frequency doubling of thin disk laser systems. A thin disk laser system comprises a few hundred micron-thick Yb-doped gain medium implanted in a mirror which is mounted on the heat sink. Low thermal lensing and large mode area are principal qualities leading to multi-kW IR output power levels. Main disadvantages of these systems include a large form-factor (i.e., bulky and cumbersome structure) and complexity of the resonator design. It also remains quite challenging to maintain the excellent beam quality with power scaling. The fundamental mode beam quality can be obtained by using apertures in the resonator cavity which detrimentally affect the efficiency of the system. To the best of the Applicants' knowledge, an intracavity frequency doubled Yb:YAG thin disk laser may deliver no more than 255 W of CW SM green light.

Fiber Lasers

Fiber lasers—the subject matter of the current invention—have experienced a steep increase in the maximum output powers achieved in the near IR region. Inherent to fiber lasers are the efficient thermal management and good beam quality. Comparing to other technologies, fiber lasers have an excellent wall-plug efficiency at a low cost, a very compact form-factor and a great power scalability potential. With the advance of high-power SM fiber laser technology, fiber lasers are becoming a source of choice for generating high-power SM green radiation via frequency doubling.

Overview of Green Fiber Laser Techniques

Just like DPSS green lasers, fiber lasers can generate green light in the intracavity configuration. Using this approach, generation of 19 W of CW green radiation has been reported with $M^2$ of ~1.2. However, the intracavity frequency doubling of fiber lasers currently remains rather an exotic technology because of difficulties related to the efficient beam coupling between fiber and bulk cavity elements that are integral to this design. This is why two main approaches, which are used to generate high power green light from fiber-based laser sources, are single-pass SHG and resonantly enhanced SHG.

FIG. 1 illustrates a single-pass green fiber laser including a pulsed pulsed master oscillator power fiber amplifier (MOPFA) laser system 10 outputting a train of IR light pulses through focusing optics 12 at a fundamental wavelength which, as shown here, is 1064 nm. The laser of FIG. 1 further has a very simple frequency converter that has only two main components—non-linear crystal 14 for SHG and spectral filter 16 to separate green light at a 532 nm wavelength from an unconverted IR light. Due to relatively low non-linear coefficients of LBO nonlinear crystal 14, which is most commonly used in industrial high power green lasers, this approach requires high peak power for efficient second harmonic generation (SHG). The high peak power requirement is one of the reasons this approach is utilized in pulsed lasers with duty cycles of around or less than 0.1%.

FIG. 2 shows an exemplary schematic for a low/moderate output power CW green fiber laser configured with an external resonant cavity. In particular, the shown configuration is based on resonantly-enhanced SHG providing high intra-cavity power in order to achieve highly-efficient SHG. Using this approach, the CW green laser is capable of outputting over 170 W of power with wall-plug efficiency of over 23% while maintaining excellent beam quality. To obtain this result, the output of single frequency (~140 kHz linewidth) fiber laser 20 with a MOPFA configuration is configured to generate 230 W CW at 1064 nm which is coupled into an external bow-tie SHG resonator 24 enclosing a nonlinear crystal crystal 14, such as an LBO as shown in the figure, for generation of green light. The resonance frequency of the resonator in this example is actively locked to the frequency of the fiber laser by adjusting position of one of the resonator mirrors 22 using Pound-Drever-Hall technique well known to one of ordinary skill in the laser arts.

Green lasers based on resonantly-enhanced SHG approach have many advantages, such as inherent single-frequency (SF) operation, which makes them perfect sources for holography and atom cooling and trapping. The green output of these lasers is true continuous-wave with very low optical noise. In addition, with proper optimization of the fiber source and the external cavity, SHG efficiency of up to 90% and wall-plug efficiency up to 30% can be achieved even at relatively low power (10 W and below).

On the other hand, there are also several disadvantages associated with this approach. First of all, it requires a single-frequency (SF) fiber laser in order to couple light into the narrow-linewidth external cavity. This imposes limits on the power scalability of this technique—the maximum output power of the green fiber lasers built in this configuration is usually limited by Stimulated Brillouin Scattering (SBS) threshold in the fiber amplifier. The resonantly-enhanced SHG converter is rather a complex system as compared to the single-pass frequency converter. At high power levels, the NL crystal may show signs of degradation due to prolonged exposure to high optical intensities. In these cases, a commonly deployed technique of NL crystal shifting can help extend the lifetime of the system. However, it is difficult to realize this shift in the external resonator design due to somewhat strict cavity alignment tolerances. Another disadvantage of the resonantly-enhanced SHG is the resonator sensitivity to intense vibrations, especially the high-frequency ones.

Single-pass SHG configuration is free from all of the above discussed disadvantages. However, as mentioned above, its practical usage is mainly limited to pulsed lasers. In order to utilize this technique for CW lasers with reasonable SHG efficiency (30% or higher), the output power of the IR fiber laser should be in the kilowatt range. Fabry-Perot single-mode fiber lasers with multi-kW level of IR output power were developed years ago. However, their usage for SHG is impractical due to a relatively large bandwidth of such lasers compared to the spectral acceptance of SHG crystals, which results in the decreased conversion efficiency. Single-frequency fiber lasers, on the other hand, maintain narrow linewidth during the amplification, but kW levels of power are challenging due to SBS limitations.

A need therefore exists for a Green fiber laser employing a single-pass SHG scheme overcoming the above-disclosed limitations.

Another need exists for a SM fiber laser operating in a Green spectral range in a continuous-wave (CW) or quasi-continuous-wave (QCW) mode with a wall plug efficiency up to 30% and higher in a 510-540 nm wavelength range and in a power range of up to kW-levels.

SUMMARY OF THE DISCLOSURE

The above needs are met by the inventive 1064 nm fiber laser system configured to output up to kW-levels of linearly polarized, narrow-linewidth GREEN emission with linewidth <0.1 nm and $M^2$<1.15 at full power varying in a range between about 50 W and kW-levels. The disclosed high power single transverse mode ("SM") fiber laser operates in a Green spectral range in both continuous-wave (CW) and quasi-continuous-wave (QCW) regimes or modes and is further referred to as Green fiber laser.

The inventive Green fiber laser is configured with a source, outputting light at a fundamental wavelength in one (1) micrometer spectral range, and a single pass second harmonic generator (SHG) receiving the light from the source and operative to output Green light at a converted 5xx nm wavelength. In this disclosure, the source is further referred to as a pump or pump source for the SHG. Accordingly, the light at the fundamental wavelength, which is coupled into the SHG, is further referred to as pump light.

The pump source includes a single transverse mode (SM) single frequency (SF) linearly polarized (LP) seed laser, one or more fiber amplifiers, an optional linewidth broadening system, and a focusing optic. Together, the seed and fiber amplifier(s) represent a master oscillator power fiber amplifier (MOPFA) architecture.

Structurally, the SF LP seed laser is operative to emit SM SFLP light with linewidth narrower than 0.2 nm at the fundamental wavelength. The SM SF LP seed laser may be selected from distributed feedback (DBF) semiconductor lasers or fiber lasers. The fiber amplifiers may include a single or multiple pre-amplifying stages, which are optional, and a booster amplifier. The fiber amplifiers all are configured with an active fiber doped with ytterbium (Yb) ions and further referred to as Yb amplifier(s). The Yb fiber amplifier is operative to amplify the received SM light while maintaining the linewidth narrower than 0.2 nm. With the above-disclosed basic platform, the inventive SM Green fiber laser operates with a wall plug efficiency between 15% and 30% in a 510-540 nm wavelength range in a power range between about 50 W and kW-levels.

One of the limitations of high power and therefore high conversion efficiency is known to be stimulated Brillouin Scattering (SBS) which is an undesirable nonlinear phenomenon. Accordingly, the narrow linewidth should be broadened. One of the principal approaches known to mitigate the effects of SBS is to increase the linewidth of the seed. This is done by means of a linewidth broadening system integrated in the disclosed pump source which operates in a CW regime and, in some embodiments of the disclosed pump source which operates in a QCW regime. When used, the line broadening system is operative to increase an SBS threshold in the fiber amplifier to multi-kW level. As a result, higher powers of a SM beam allow a more efficient conversion in the nonlinear crystal. The linewidth broadening system for the single frequency seed may be configured with a noise source, RF amplifier and phase modulator. The latter may be replaced by an amplitude modulator. Regardless of the type of the used modulator, the broadening system is configured to homogeneously broaden the single frequency linewidth of the light from the seed source to a linewidth between 10 to 40 GHz.

The SHG scheme of the disclosed CW and QCW SM Green fiber laser is based on a Lithium Triborate ("LBO") nonlinear crystal. The LBO is configured with the length varying between at least two (2) centimeters to about six (6) centimeters. In some of the embodiments of the disclosed pump source, the fibers are made a polarization-maintaining format. An alternative embodiment of the pump source features fiber components made in a non-polarization format. In the latter, the disclosed pump source has a polarization controller located between the seed source and Yb fiber amplifier, polarization analyzer between the Yb fiber amplifier and the nonlinear crystal, and a feedback loop between the polarization analyzer and polarization controller. The function of the entire polarization scheme is to maintain the linear polarization at an input of the LBO. Optionally the disclosed Green laser may further be configured with an additional nonlinear optical frequency converter for converting the Green light to lower or higher frequencies.

BRIEF DESCRIPTION OF THE DRAWINGS

The above and other features of the disclosure will become more readily apparent from the specific description accompanied by the following drawings, in which:

FIG. 4A is an optical schematic of the inventive high-power CW green laser of FIG. 3 provided with a linewidth-broadening system;

FIG. 4B illustrates the output green power and SHG conversion efficiency of the SM green fiber laser of FIG. 4A;

FIG. 5A is an optical schematic of a narrow-linewidth SF SM LP pump source utilized in the inventive CW mode-operating Green fiber laser and in some embodiments of the inventive QCW mode-operating Green laser;

FIG. 5B illustrates a linewidth broadening mechanism;

FIG. 5C is a diagrammatic view of the booster active fiber utilized in all CW and QCQ architectures of the disclosed laser;

FIG. 6A is an optical schematic of the inventive high-power QCW green laser with the linewidth-broadening system;

FIG. 6B illustrates the output green power and SHG conversion efficiency of the SM green fiber laser operating in QCW mode of FIG. 6A;

FIG. 7A illustrates an optical schematic of the inventive high-power QCW green laser operating without the linewidth-broadening system;

FIG. 7B illustrates the output green power and SHG conversion efficiency of the SM green fiber laser operating in QCW mode without linewidth broadening system of FIG. 7A;

SPECIFIC DESCRIPTION

The disclosed fiber-laser-based single-mode single frequency green source is capable of operating in a wide range of regimes from CW to high-repetition-rate QCW and generating up to kW level of average power by providing a high power laser of linearly polarized narrow-linewidth emission while still maintaining linewidth of less than 0.1 nm and $M^2<1.15$ at full power.

Figure 3:
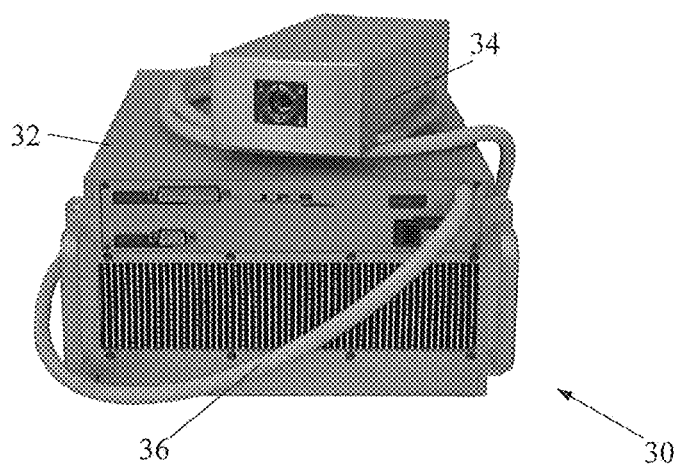
FIG. 3 is a perspective view of the inventive ultra-high power SM GREEN laser.

Referring to FIG. 3, the inventive SM fiber Green laser 30 includes a main console 32 housing a signal generator, pre-amplifying stage(s) (if necessary), booster amplifier, electronics and etc. The inventive laser 30 further includes a laser head 34 spaced from main console 32 and housing a harmonic generator for second and higher (if necessary) harmonics scheme and focusing optic. A flexible cable 36 extends between console 32 and laser head 34. Typically, Green laser 30 employs a master oscillator and power amplifier (MOPFA) configuration with the power amplifier having one or more fiber preamplifiers and a booster—the last and most powerful amplifier. The fiber (pre) amplifier is configured with an optical fiber as a gain media doped with ions of rare earth elements, such as Ytterbium (Yb).

FIG. 4A illustrates a diagrammatic schematic of the disclosed Green fiber laser operating in a CW mode. The laser system 30 includes a CW pump source configured with a single frequency (SF) single mode (SM) polarized (LP) seed source or laser 38, which generates pump light, linewidth-broadening system 40, a single-mode multi-stage fiber amplifier that may have a pre-amplifier(s) 42 and booster amplifier 44, and a focusing optic 46. The seed source 38 is configured as a DBF SF laser preferably outputting linearly polarized light, although it also can be configured to output circularly-polarized pump light. The laser 30 also has a single pass SHG including an LBO nonlinear crystal 48, which converts the pump light to Green light, and a dichroic mirror 50 which reflects the pump light but transmits the Green light.

Referring to FIG. 4B, as the power of pump light increases, the power of Green light also tends to increase. The optical efficiency of the SHG scheme also increases with the growing pump light power.

Referring to FIGS. 5A and 5B, the pump source (also referred to as a main platform) is configured to operate in all CW and some QCW architectures of the present invention. It operates in a one-micron fundamental wavelength range, such as a 1064 nm wavelength, to output a narrow-linewidth emission pump light. Preferably, the all fiber components of fiber amplifiers 42 and 44 are linearly polarized. Alternatively, the fiber components of the inventive pump source may be configured in a non-polarization maintaining format, as will be latter discussed in detail.

The CW pump source includes the SF SM LP laser diode or SM SF fiber laser 38, linewidth-broadening system 40, which is configured with a phase modulator 50, source of an amplified RF noise 52, and a single-mode polarization-maintaining multi-stage fiber amplifiers 42, 44.

The pump source is configured to emit the pump light having a linewidth <0.2 nm and the beam quality parameter $M^2<1.15$ at full power, which for all practical purposes of this invention is considered to be a single transverse mode beam. The linewidth of seed 38 is broadened from less than 1 MHz to about 20-25 GHz in order to increase the SBS threshold in the fiber amplifier to multi-kW level. An example of spectral linewidth broadening after phase modulator 50 is shown in FIG. 5B.

At the maximum output power, the optical noise of the amplifier is ~1% peak-to-peak and polarization extinction ratio (PER) is better than 50:1 (>17 dB); high PER being beneficial for frequency doubling applications. Despite the high output power, the amplifier is packaged in a very compact and light-weight module with dimensions of only 532×332×52 mm and the total weight of less than 12 kg with all the components (pump diodes, isolators, gain blocks, control boards etc.) installed.

Referring to FIG. 5C, booster 44 of FIGS. 4A and 5A is configured with a monolithic (one-piece) multimode core 54 extending between the opposite ends of the booster opposite and supporting multiple transverse modes, and at least one cladding 60. The core 54, however, is configured to support only a single, fundamental mode at the desired fundamental wavelength. This is realized by matching a mode field diameter (MFD) of MM core 54 to that of a SM passive fiber 62 that guides SM pump light from seed 38 of FIGS. 4A and 5A along its core 64, and to an output SM fiber 59. The combination of the active and passive input and output fibers is enclosed in a housing and referred to as a fiber block.

To further increase the SBS threshold, core 54 has a double bottleneck-shaped cross-section. In particular, core 54 is configured with a uniformly-dimensioned input core end 56 that may or may not have a geometrical diameter equal to that of SM core 64 of passive fiber 62. When the SM pump light from seed 38 at the fundamental wavelength is coupled into core input end 56 of MM core 54, it excites only a fundamental mode whose intensity profile substantially matches a Gaussian intensity profile of the pure SM.

The core 54 further includes a large diameter uniformly dimensioned mode transforming core part 58 that receives the guided fundamental mode through an adiabatically expanding mode transforming core region 66. The large diameter of central core region 58 allows receiving greater amplifier pump powers without, however, increasing a power density within this part which raises a threshold for SBS. The output mode transforming core region 57 may be configured identically to core part 66 of core 54 to adiabatically reduce the mode field diameter of amplified pump light at the fundamental frequency. The latter is then coupled into an output SM passive fiber 59 receiving the amplified SM pump light practically without coupling losses.

Experimentally, well over 350 W at 532 nm from ~1 kW pump at the fundamental wavelength with ~35% SHG efficiency has been observed in a CW mode of operation. The 2 kW narrow-linewidth SM Yb fiber amplifier with booster 44 of FIG. 5C improves the SHG efficiency to 60-70%, and increases the green power to 1 kW and above.

Figure 1:
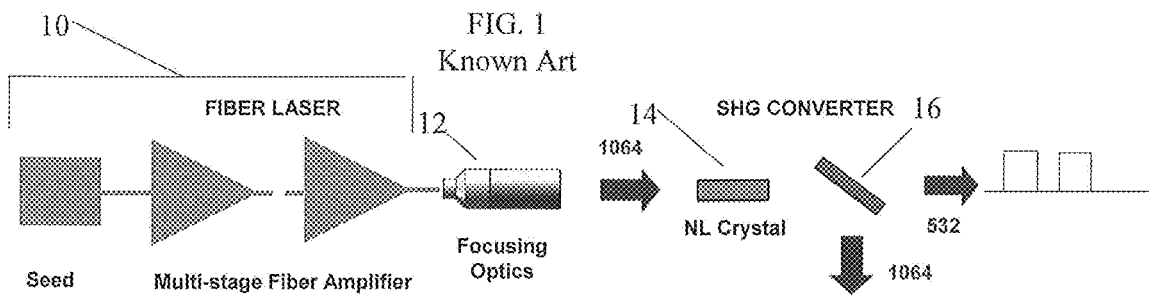
FIG. 1 is a schematic of the known fiber laser utilizing a single-pass SHG.
Figure 2:
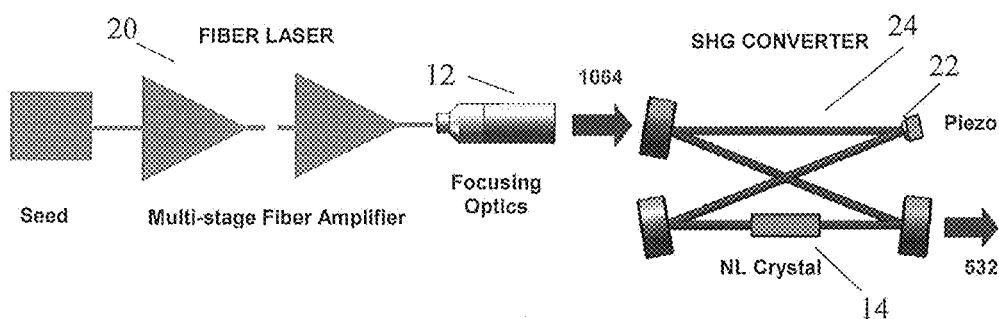
FIG. 2 is a schematic of the known fiber laser provided with a resonantly-enhanced SHG scheme.

The Green power in the prior art architectures shown in FIGS. 1 and 2 is, in principle, limited by to factors: the pump light source power and crystal tolerance to withstand this power. The configuration of booster amplifier 44 allows emitting SF SM LP pump light of up to kW levels. Such a high power level is believed to be significantly higher than that of any of the known to Applicants pump sources utilized in the known Green systems.

Referring to FIG. 6A, the QCW regime is realized on the same main platform as the true CW green source of FIG. 4A having the booster amplifier 44 of FIG. 5C which is utilized without any modifications as long as it operates below an SBS threshold. The QCW regime is realized by adding a pulse modulator 70 operative to directly modulate the current at the input of seed laser 38 with 2-100% duty cycle. The output of the Yb-doped source is focused into high-quality LBO crystal 48 that may be configured identically to that of the CW regime for the single-pass SHG conversion.

The inventive QCW high-power green laser system of FIG. 6A is configured to have a high average power of the pump source and high repetition rate and high duty cycle. In one of numerous experiments, the pump current of SM SF LP seed source 38 is directly modulated at 4 MHz repetition rate and 50% duty cycle, resulting in the amplified pump light peak power of ~2 kW at ~1 kW average power; the peak power is still being well below the SBS threshold of the utilized amplifier with the linewidth of ~20 GHz. The increased peak power consequently results in higher SHG efficiency compared to the CW case. It is important to note that the pump (not shown) for booster 44, which may include a single or multiple MM diode lasers, operates in the CW mode. Also, because of the high repetition rate, the 125 ns pulses showed no significant form distortion due to gain depletion, during amplification to the full power. The experiment with 2 kW of pump light peak power output, the SHG efficiency improves compared to the CW configuration of FIG. 4A from less than 35% to well over 50% at the same average power. The obtained green average power and the corresponding conversion efficiency is plotted in FIG. 6B with respect to the average pump power.

For example, the GREEN laser of FIG. 6A generates over 550 W of green light average power. This corresponds to SHG conversion efficiency of ~52% and wall-plug efficiency of the entire green laser system over 16%. During experiments, the green power has not shown any signs of roll-off. Up to the maximum green power of over 550 W, no sign of beam quality degradation has been observed; the green beam has remained nearly diffraction limited. The maximum green power of above 550 W is believed to be uniquely high for QCW SM SF Green fiber systems and can only increase to kW levels with the increased pump light peak power.

Turning to FIG. 7A, the inventive QCW Green laser system differs from that of FIG. 6A by not having a linewidth broadening component. However, the single-pass SHG efficiency of the inventive QCW green laser of FIG. 7A is improved to a 60-70% range typical for pure pulsed green lasers. The improved SHG efficiency is due to substantially higher pump peak powers of SM light at the fundamental wavelength. For example, currently, a 4-5 kW level peak power of pump light source has been used in the architecture of FIG. 7A. With these high peak powers, the technique different from the linewidth broadening of FIGS. 4A and 6A is required. In particular, this technique requires shortening of the pulse duration. Removing the phase modulator and accompanying electronics from the laser makes the QCW Green laser system of FIG. 7A even more simple and cost-effective by comparison with the architectures of FIGS. 4A and 6A. However, the same decrease of the duty cycle, of course, may be realized in the architecture of FIG. 6A too which would lead to the same characteristics of the output light as in FIG. 7A.

Numerous experiments with the architecture of FIG. 7A show that pump light peak power of ~5.5 kW is achieved at the average power of 384 W without the onset of SBS. After passing through the SHG converter, the resulted green average output power of 241 W generated with SHG efficiency of ~63% which is illustrated in FIG. 7B. In this experimental configuration, the overall wall-plug efficiency of the green laser system has reached 20%. The SHG efficiency of ~63% is comparable to efficiency achievable with low duty cycle single-pass pulsed green lasers, and with resonantly-enhanced CW green lasers. The experiment also showed that this Green power can be increased in response to the increased pump light peak power while the SHG efficiency is still maintained above 60%.

In summary, the above disclosed configurations and results, to the best of Applicants' knowledge, are unique for the known CW and QCW SF SM green laser sources. The experiments also show no adverse effects in non-linear crystal 48. As mentioned above, the output GREEN power in the disclosed architectures of respective FIGS. 4A, 6A and 7A is only limited by the utilized pump source, which makes the configuration of booster 44 of FIG. 5C so advantageous due to its high output powers. It is apparent that by adjusting the duty cycle of the QCW seed laser of both FIGS. 6A and 7A, the experimentally achieved 60% SHG efficiency conversion for a wide range of green output powers starting as low as 50-100 W and ending as high as several kWs is far from being the ceiling. For example, employing a multi-kW narrow-linewidth SM Yb fiber booster 44 configured in accordance with FIG. 5C, up to several kWs of an average green output power in CW and even higher in QCW regimes can be obtained.

Figure 8:
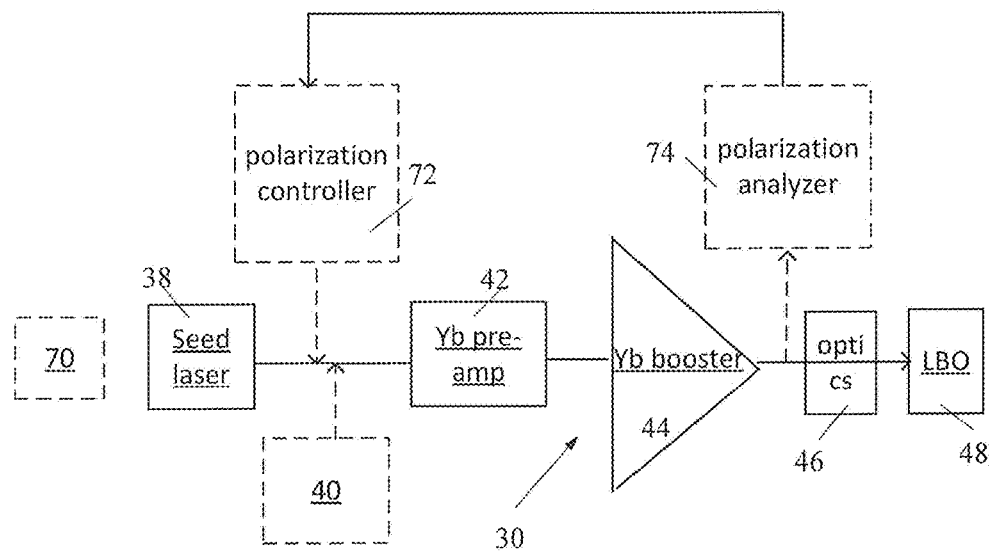
FIG. 8 illustrates an optical schematic of the disclosed CW/QCW single pass SHG platform used in FIGS. 4A, 6A and 7A with the components configured in a non-polarization maintaining format.

FIG. 8 illustrates SM high power Green system 30 which is configured with fiber components realized in a non-polarization maintaining format in the CW architecture of FIG. 4A and both QCW architectures of respective FIGS. 6A and 7A. In this architecture, the means for controlling polarization is added and includes a polarization controller 72 located between polarized seed 38 and Yb fiber (pre) amplifier 42 and a polarization analyzer 74 between booster 44 and LBO 48. Providing a feedback loop 78 between polarization analyzer 74 and polarization controller 72, the desired polarization of the pump light at the fundamental frequency at an input of the nonlinear crystal is continuously monitored and maintained.

Figure 9A:
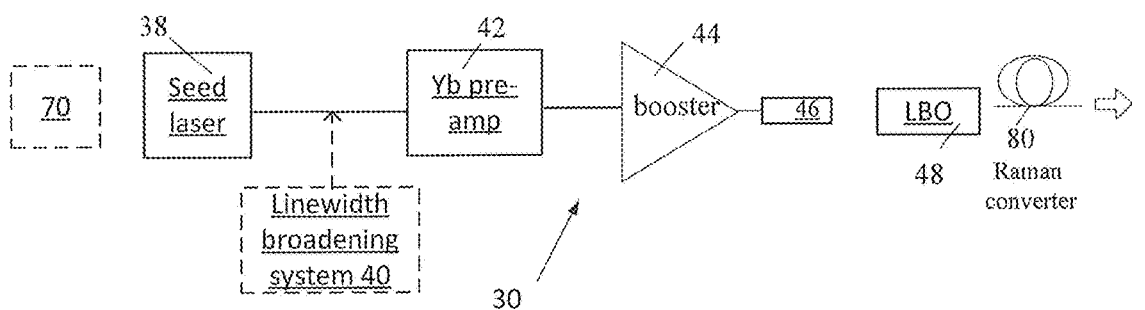
FIGS. 9A and 9B illustrate respective architectures of the inventive Green laser utilizing a Raman laser.

Referring to FIG. 9A, Green light has a fair share of industrial applications. Currently, green light sources find their broadest application in display industries, for example, red-green-blue (RGB) digital displays, or entertainment industry. However, green narrow spectrum, even when it is increased as disclosed in FIGS. 4-8, is inefficient against a speckle noise on the screen. To somewhat broaden the linewidth of resulted green light in all of disclosed configurations, a Raman converter, i.e., a length of passive fiber 80 is added to the inventive configuration after the SHG scheme including LBO 48. The one or multiple Stokes at wavelengths that are increasingly longer than the original Green wavelength are characterized by a broader linewidth which reduces the speckle noise. Alternatively, instead of the Raman converter, an optical parametric oscillator, well known to one of ordinary skill in the art, can be used in all above disclosed schematics. The schematic of FIG. 9A is effective for minimizing a speckle noise that may otherwise be seen on the screen illuminated by the output Green light.

Figure 9B:
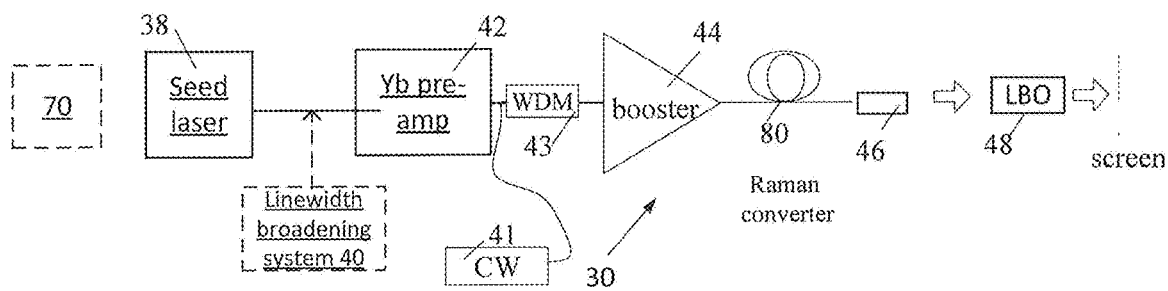

FIG. 9B illustrates an alternative schematic configured to reduce the speckle noise. Similar to FIG. 9At, Green laser 30 is based on the main platform of FIGS. 6-7. The amplifying and booster cascades each are configured with an Yb-doped fiber pumped by a laser diode pump which operates in a CW regime (not shown). The amplifiers sequentially increase the power of pulsed pump light which is further coupled into Raman converter 80 where it is effectively converted to sequential stokes orders with a broader spectral linewidth coupled into SHG 48 with a broad spectral acceptance at the desired Raman-shifted wavelength.

The Raman-shifted wavelength range may still be excessively broad and detrimentally affect the conversion efficiency despite the broadband spectral acceptance range of the LBO. In this case, the desired Stokes order is narrowed by pumping LBO 48 by light from a broadband Raman seed 41 operating in a CW regime. The SM pump light at the fundamental wavelength and Raman seed light are coupled into a WDM 43 before being amplified in booster 44. In this schematic, temporal characteristics are determined by SM seed source 38, while the spectral properties of the pump light at the Raman-shifted wavelength are determined by the CW Raman seed 41 and broadening of the linewidth in the Raman converter. Accordingly, the wavelength and linewidth of the Raman seed's output can be tailored to a specific linewidth within the desired pump light wavelength range. The schematic of FIG. 9B, like that of FIG. 9A, is operative to minimize a speckle noise generated by output Greenlight which is incident on the screen.

Figure 10:
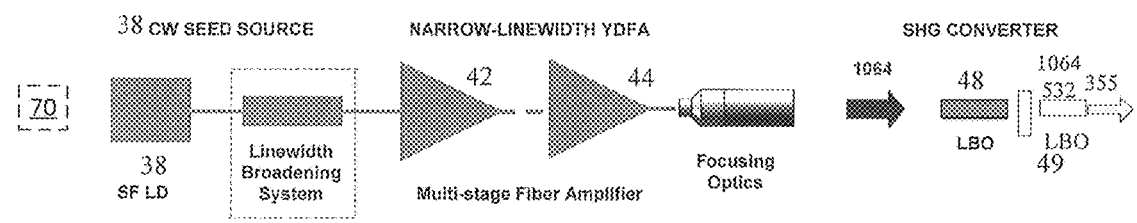
FIG. 10 illustrates a frequency-tripling scheme based on the Green laser of FIGS. 4A, 6A, 7A and 8.
Figure 11A:
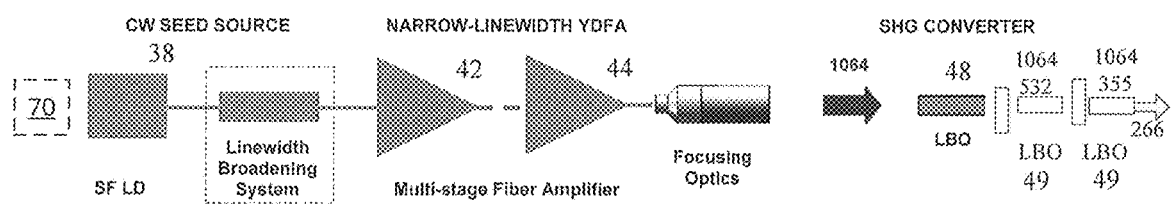
FIGS. 11A and 11B illustrate respective frequency quadrupling schemes based on the Green laser of FIGS. 4A, 6A, 7A and 8.
Figure 11B:
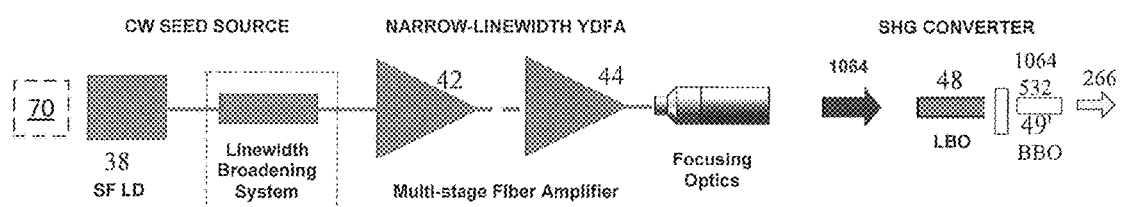

Referring to FIGS. 10, 11A and 11B, inventive Green laser system 30 of all relevant above-disclosed FIG. 4A can be used for outputting high-average power single-mode UV lasers via third and fourth harmonics generation (THG and FHG, respectively).

Referring specifically to FIG. 10, the shown frequency tripling scheme in addition to the main platform and SHG scheme further includes a second nonlinear crystal, such as LBO 49 in which pump and Green lights mix to generate UV light at about 355 nm wavelength (third harmonic generation of 1064 nm wavelength). The pulse driver 70 is shown in dash lines to illustrate the possibility of using the shown frequency tripling scheme not only in the architecture of FIG. 4A operating in a CW regime, but also in a QCW regime of FIGS. 6A, 7A and 8. In case of the QCW regime, of course, the shown frequency tripling scheme effectively operates in the architectures of FIGS. 8, 6A, and 7A with the latter not requiring the linewidth broadening system. The experiments with the above-disclosed schematic produce powers of up to 200 W of UV light at about 355 nm wavelength.

FIG. 11A illustrates a frequency quadrupling scheme utilizing the main platform of FIGS. 5A and 5C, the SHG generator including LBO 48 and in addition two additional LBO crystals 49. In the first LBO crystal 49 the residual pump light at fundamental 1064 nm wavelength mixes with Green light at about 532 nm wavelength to generate the UV light at 355 nm wavelength. The rest of the pump light and generated UV light at about 355 nm is further mixed in a subsequent LBO 49 to produce deep UV light at a 266 nm wavelength. The presence of components shown in dash lines points out to the possibility of using the shown schematic in both CW and QCW regimes of FIGS. 4A, 6A, 7A and 8 with a few obvious alterations discussed in detail above.

FIG. 11B illustrates the alternative schematics of the frequency quadrupling scheme in which two additional LBO crystals are replaced by a single Barium Borate (BBO) crystal 49'. The shown architecture can be utilized is all schematics of FIGS. 4A, 6A, 7A and 8.

Figure 12:
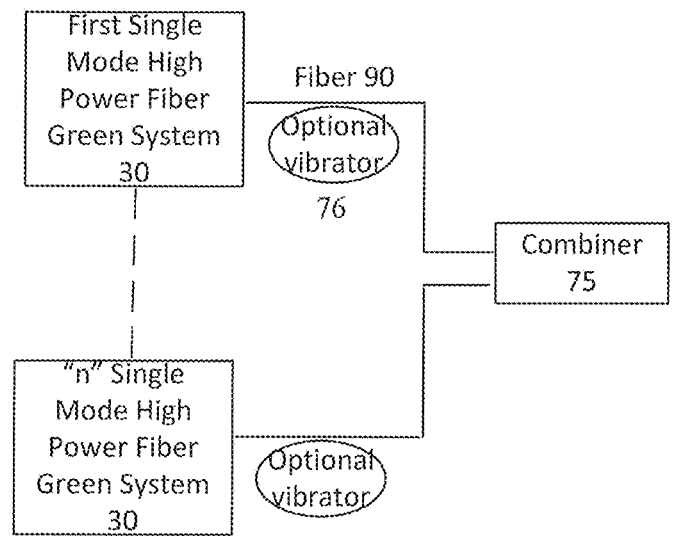
FIG. 12 is an exemplary schematic of a high power Green fiber laser system implementing a plurality of the inventive fiber lasers shown in any of FIGS. 4A, 6A, 7A, 8 and 9A.

Referring to FIG. 12, multiple Green fiber lasers 30 are combined together to constitute a system outputting ultra-high powers of Green light. As shown, the system includes at least two high power single mode ("SM") Green lasers 30 configured in accordance with any of the configurations of respective FIGS. 4-8. The output MM fibers 90 of respective Green lasers deliver Green light beams to a MM combiner 75.

One of the applications of the modified system of FIG. 12 may be used d to increase a linewidth of Green light. As known, a speckle noise is a result of highly coherent nature of laser radiation. Accordingly, the modified system of FIG. 12 may include multiple Green lasers 30 which output respective Green lights at different wavelengths with a distance between opposite extreme wavelengths varying with a 10 nm to about 20 nm wavelength range. The output fibers 90 deliver respective Green light beams to MM combiner 75 where the outputs are combined in a single MM system Green light output with an increased linewidth.

To fill the full aperture of the fiber, it is possible to intensify mode mixing, by a plurality of external actuators, such as piezo vibrators 76 can be used. The vibrators 76 each can be used in association with MM output fiber 90, as shown in FIG. 12. Alternatively, vibrator 76 may be positioned immediately before or after the combiner 75.

It is to be understood that the invention is not limited to those precise embodiments, and that various changes, modifications, and adaptations may be effected therein by one skilled in the art without departing from the scope or spirit of the invention as defined in the appended claims.

The invention claimed is:

1. A high power single mode (SM) fiber laser operating in a Green spectral range comprising:
    a quasi-continuous wave (QCW) laser source operating with a duty cycle between about 2 and 100% with the 100% duty cycle corresponding to a continuous-wave (CW) mode, the QCW laser source configured with:
        a single frequency (SF) single mode (SM) linearly polarized (LP) seed operative to generate SF SM LP light with a linewidth lower than 1 MHz at a fundamental wavelength in one (1) micrometer spectral range, and
        at least one ytterbium (Yb) doped fiber amplifier receiving and amplifying the SF SM LP light at the fundamental wavelength while maintaining the linewidth narrower than 1 MHz;
    a nonlinear optical frequency converter configured to convert the amplified SF SM LP light in a single-pass second-harmonic generator (SHG) to output SM Green light, wherein the SM fiber laser operates with a wall plug efficiency between 15% and 30% in a 510-540 nm wavelength range and an average power level of from about 50 watts (W) up to a 2 kW level; and
    a phase modulator or amplitude modulator coupled between the seed and the at least one Yb doped fiber amplifier and operative to homogeneously broaden the single frequency linewidth of the SF SM LP light from the seed to a linewidth between 10 to 40 GHz.

2. The high power SM fiber laser of claim 1 further comprising at least one SM Yb fiber pre-amplifier between the seed and the at least one Yb fiber amplifier.

3. The high power SM fiber laser of claim 1 further comprising focusing optics between the at least one Yb fiber amplifier and the nonlinear optical frequency converter.

4. The high power SM fiber laser of claim 1, wherein the nonlinear optical converter includes a Lithium Triborate (LBO) nonlinear crystal having a length varying between at least two (2) centimeters and about six (6) centimeters.

5. The high power SM fiber laser of claim 1, wherein the at least one Yb fiber amplifier is configured in a polarization maintaining (PM) format.

6. The high power SM fiber laser of claim 1, wherein the at least one Yb fiber amplifier is configured in a non-polarization maintaining format.

7. The high power SM fiber laser of claim 6 further comprising a polarization controller located between the seed and the at least one Yb fiber amplifier, a polarization analyzer between the at least one Yb fiber amplifier and the nonlinear optical frequency converter, and a feedback loop between the polarization analyzer and polarization controller, the feedback loop being configured to maintain the linear polarization at an input of the nonlinear optical frequency converter.

8. The high power SM fiber laser of claim 1 further comprising a Raman converter receiving the output Green light at a signal wavelength and configured to output Raman-shifted Green light at a desired Raman-shifted wavelength.

9. The high power SM fiber laser of claim 1 operating in the QCW mode further comprising:
    a Raman converter coupled to the at least one Yb fiber amplifier to convert the fundamental wavelength of the SF SM LP light to a Raman-shifted wavelength of the SF SM LP light, and
    a broadband CW Raman pump source outputting light at the Raman-shifted wavelength which is coupled into the at least one Yb fiber amplifier.

10. The high power SM fiber laser of claim 1, wherein the nonlinear optical frequency converter includes a lithium triborate (LBO) nonlinear crystal, and further comprising two additional LBO crystals or a single barium borate (BBO) crystal to generate a fourth harmonic of the SM pump light.

11. The high power SM fiber laser of claim 1 further comprising at least one fiber block including:
- the at least one Yb fiber amplifier provided with a monolithic multimode (MM) core surrounded by at least one cladding,
- the MM core being configured to support a single fundamental mode at the fundamental wavelength and including:
- opposite input and output uniformly dimensioned core regions,
- a uniformly dimensioned central core region having a diameter larger than that of the input and output core regions, and
- a pair of mode transforming regions bridging the input and output core regions with respective ends of the central core region;
- an input SM passive fiber guiding the SF SM LP light and coupled to the input core region of the YB fiber amplifier, and
- an output SM passive fiber coupled to the output core region of the at least one Yb fiber amplifier to guide the amplified SF SM LP light, the SM input and output passive fibers and the input and output core regions of the at least one Yb fiber amplifier being configured with respective mode field diameters matching one another.

12. The high power SM fiber laser of claim 1, wherein the SF SM LP seed is configured as a distributed feedback.

13. An ultra-high power fiber laser system comprising:
- at least two high power single mode (SM) fiber lasers each configured in accordance with claim 1 and having an output fiber guiding the SM Green output light, the two high power SM fiber lasers being configured to output respective SM Green lights; and
- a multimode combiner configured to combine the SM Green lights.

14. The ultra-high power fiber laser system of claim 13, wherein the at least two high power SM fiber lasers are configured to output respective Green lights at different signal wavelengths which are spaced from one another at a distance between at least 10 nm and about 20 nm.

15. The ultra-high power fiber laser system of claim 13 further comprising a plurality of piezo vibrators actuating respective delivery fibers so as to fill a fiber aperture.

16. The high power SM fiber laser of claim 1, wherein the nonlinear optical frequency converter includes a lithium triborate (LBO) crystal, and further comprising an additional LBO crystal to generate a third harmonic of the SM pump light.

* * * * *